(12) United States Patent  
Gupta

(10) Patent No.: US 9,930,132 B2  
(45) Date of Patent: Mar. 27, 2018

(54) CONTENT SPECIFIC ROUTER CACHING

(71) Applicant: Facebook, Inc., Menlo Park, CA (US)

(72) Inventor: Vikas Gupta, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 153 days.

(21) Appl. No.: 14/152,166

(22) Filed: Jan. 10, 2014

(65) Prior Publication Data

US 2015/0201033 A1   Jul. 16, 2015

(51) Int. Cl.
*H04L 29/08*   (2006.01)
*H04L 29/06*   (2006.01)

(52) U.S. Cl.
CPC ...... *H04L 67/2842* (2013.01); *H04L 67/2852* (2013.01); *H04L 63/08* (2013.01)

(58) Field of Classification Search
CPC ........................................................ H04L 65/08
See application file for complete search history.

(56) References Cited

U.S. PATENT DOCUMENTS

| | | | |
|---|---|---|---|
| 5,864,837 A * | 1/1999 | Maimone | G06F 12/0815 |
| 6,941,338 B1 | 9/2005 | Madsen et al. | |
| 6,957,212 B2 * | 10/2005 | Peng | G06F 17/30902 |
| | | | 707/758 |
| 7,069,328 B1 | 6/2006 | Bell et al. | |
| 7,099,927 B2 * | 8/2006 | Cudd | G06F 17/30902 |
| | | | 707/E17.12 |
| 7,359,933 B1 | 4/2008 | Polen et al. | |
| 7,574,481 B2 * | 8/2009 | Moore | G06F 8/68 |
| | | | 707/999.202 |
| 7,743,022 B2 * | 6/2010 | Kaasten | G06F 17/30176 |
| | | | 707/612 |
| 7,865,463 B2 * | 1/2011 | Sollicito | G06F 17/30902 |
| | | | 707/610 |
| 8,255,921 B2 | 8/2012 | Arvidsson et al. | |
| 8,279,780 B2 | 10/2012 | Yamamoto | |
| 8,316,098 B2 * | 11/2012 | Luna | G06F 9/5016 |
| | | | 709/201 |
| 8,601,090 B1 | 12/2013 | Cormie et al. | |
| 8,788,475 B2 * | 7/2014 | Fredricksen | G06F 17/30011 |
| | | | 707/689 |

(Continued)

FOREIGN PATENT DOCUMENTS

JP       2003008664 A       1/2003

OTHER PUBLICATIONS

U.S. Appl. No. 14/338,994 by Coglitore et al., filed Jul. 23, 2014.

(Continued)

*Primary Examiner* — Shirley Zhang
(74) *Attorney, Agent, or Firm* — FisherBroyles, LLP

(57) ABSTRACT

A method of operating a router is disclosed. The method may include updating a data object to or from a router cache of the router. For example, the router may store or distribute the data object by determining whether a client device in a local network established by the router stores a version of the data object different from a version on the router cache. For another example, the router may store the data object based on a cacheable tag associated with the data object, the cacheable tag indicating that the data object is intended by a content server system to be cached in the router cache.

20 Claims, 5 Drawing Sheets

(56) References Cited

U.S. PATENT DOCUMENTS

| | | | |
|---|---|---|---|
| 8,812,651 B1* | 8/2014 | Eriksen | H04L 45/745 |
| | | | 709/224 |
| 9,015,269 B2* | 4/2015 | Ruellan | H04L 67/2842 |
| | | | 455/466 |
| 9,055,124 B1* | 6/2015 | Hill | H04L 65/403 |
| 9,189,510 B2* | 11/2015 | Song | G06F 17/30345 |
| 9,229,740 B1* | 1/2016 | Allen | G06F 9/445 |
| 2001/0030469 A1 | 10/2001 | Tsujikado et al. | |
| 2002/0087797 A1 | 7/2002 | Adrangi et al. | |
| 2002/0160773 A1 | 10/2002 | Gresham et al. | |
| 2002/0178330 A1 | 11/2002 | Schlowsky-Fischer et al. | |
| 2003/0063770 A1 | 4/2003 | Svendsen et al. | |
| 2003/0084091 A1 | 5/2003 | Agarwalla et al. | |
| 2003/0101267 A1 | 5/2003 | Thompson et al. | |
| 2004/0128346 A1* | 7/2004 | Melamed | G06F 17/30902 |
| | | | 709/203 |
| 2004/0167967 A1 | 8/2004 | Bastian et al. | |
| 2005/0102300 A1 | 5/2005 | Madsen et al. | |
| 2005/0188304 A1 | 8/2005 | Lawton et al. | |
| 2005/0234864 A1 | 10/2005 | Shapiro | |
| 2006/0010225 A1* | 1/2006 | Issa | G06F 17/30902 |
| | | | 709/217 |
| 2006/0167979 A1 | 7/2006 | Fuchs et al. | |
| 2007/0010245 A1 | 1/2007 | Levitan et al. | |
| 2008/0005195 A1* | 1/2008 | Li | G06F 17/30174 |
| 2009/0100268 A1 | 4/2009 | Garcia et al. | |
| 2009/0125391 A1 | 5/2009 | Toutonghi et al. | |
| 2009/0132640 A1 | 5/2009 | Verma et al. | |
| 2009/0168795 A1 | 7/2009 | Segel et al. | |
| 2010/0007713 A1 | 1/2010 | Yamamoto et al. | |
| 2010/0122217 A1 | 5/2010 | Yen et al. | |
| 2010/0333131 A1 | 12/2010 | Parker et al. | |
| 2011/0035503 A1* | 2/2011 | Zaid | H04L 63/0407 |
| | | | 709/228 |
| 2011/0276535 A1 | 11/2011 | Pin et al. | |
| 2011/0314085 A1* | 12/2011 | Koronthaly | G06F 17/3056 |
| | | | 709/203 |
| 2012/0198075 A1 | 8/2012 | Crowe et al. | |
| 2012/0290436 A1 | 11/2012 | Frost et al. | |
| 2013/0073609 A1* | 3/2013 | Connolly | G06F 15/16 |
| | | | 709/203 |
| 2013/0073622 A1 | 3/2013 | Nguyen et al. | |
| 2013/0080895 A1 | 3/2013 | Rossman et al. | |
| 2013/0097236 A1* | 4/2013 | Khorashadi | H04H 60/25 |
| | | | 709/204 |
| 2013/0138763 A1* | 5/2013 | Panzer | G06F 17/30902 |
| | | | 709/213 |
| 2013/0219006 A1 | 8/2013 | Kuo et al. | |
| 2014/0040412 A1 | 2/2014 | Yanagihara et al. | |
| 2014/0064095 A1 | 3/2014 | Li et al. | |
| 2014/0075307 A1 | 3/2014 | Bargas et al. | |
| 2014/0143647 A1* | 5/2014 | Reshadi | G06F 17/30902 |
| | | | 715/234 |
| 2014/0173230 A1* | 6/2014 | Smith | H04L 67/1095 |
| | | | 711/162 |
| 2014/0181040 A1* | 6/2014 | Montulli | G06F 11/1451 |
| | | | 707/652 |
| 2014/0280515 A1* | 9/2014 | Wei | H04L 67/02 |
| | | | 709/203 |
| 2014/0344437 A1 | 11/2014 | Huang | |
| 2015/0004949 A1 | 1/2015 | Fienberg et al. | |
| 2015/0169701 A1 | 1/2015 | Stekkelpak et al. | |
| 2016/0028830 A1 | 1/2016 | Coglitore et al. | |
| 2016/0028846 A1 | 1/2016 | Coglitore et al. | |
| 2016/0191673 A1 | 6/2016 | Bohannon et al. | |

OTHER PUBLICATIONS

U.S. Appl. No. 14/339,002 by Coglitore, G. et al., filed Jul. 23, 2014.

U.S. Appl. No. 14/584,815 by Bohannon, P. et al., filed Dec. 29, 2014.

International Search Report and Written Opinion for International Application No. PCT/US2014/072633 dated Sep. 1, 2015; 13 pages.

Non-Final Office Action dated Jun. 23, 2016 of U.S. Appl. No. 14/339,002 by Coglitore, G., et al., filed Jul. 23, 2014.

Final Office Action dated Dec. 9, 2016, in U.S. Appl. No. 14/339,002 of Coglitore, G., et al., filed Jul. 23, 2014.

Non-Final Office Action dated Oct. 17, 2016, in U.S. Appl. No. 14/338,994 of Coglitore, G., et al., filed Jul. 23, 2014.

Advisory Action dated Mar. 10, 2017, in U.S. Appl. No. 14/339,002 of Coglitore, G., et al., filed Jul. 23, 2014.

Final Office Action dated Mar. 23, 2017 of U.S. Appl. No. 14/338,994 by Coglitore, G., et al., filed Jul. 23, 2014.

Non-Final Office Action dated May 26, 2017 of U.S. Appl. No. 14/339,002 by Coglitore, G., et al., filed Jul. 23, 2014.

Non-Final Office Action dated Sep. 11, 2017 in U.S. Appl. No. 14/338,994 of Coglitore, G., et al. filed Jul. 23, 2014.

Advisory Action dated Aug. 3, 2017 for U.S. Appl. No. 14/338,994 of Coglitore, G. et al., filed Jul. 23, 2014.

International Preliminary Report on Patentability for International Application No. PCT/US2014/072633 dated Jul. 13, 2017; 9 pages.

Non-Final Office Action dated Aug. 14, 2017, in U.S. Appl. No. 14/584,815 of Bohannon, P. et al., filed Dec. 29, 2014.

Wathsala, W.V., et al.: "Next Generation Proxy Servers," Advanced Communication Technology, Feb. 17, 2008, pp. 2183-2187.

Final Office Action dated Nov. 14, 2017 of U.S. Appl. No. 14/339,002 by Coglitore, G., et al., filed Jul. 23, 2014.

* cited by examiner

CONTENT SPECIFIC ROUTER CACHING

TECHNOLOGY FIELD

The disclosed technology relates generally to network caching, and in particular to caching on a local router.

BACKGROUND

A large portion of the Internet follows a client server model in which client devices request content from server systems across the Internet via a browser or a different client application, e.g., a mobile application. Client devices can receive multimedia content that is unique to specific users or common across multiple users, e.g., from various websites on the Internet. Under current content delivery schemes, network traffic bottlenecks at the server end are generally relieved via content delivery networks that cache content files on cache servers distributed around the Internet nearby large concentrations of users. Network traffic bottlenecks at the client end are generally relieved via browser or other caches on the client devices. Despite the use of cache servers and the browser caches, a large amount of redundant traffic still flows through the current client/server network architecture. For example, redundant traffic may flow between content delivery networks and various servers that service multiple client devices.

Reducing redundant network traffic is desirable because it can increase overall network speeds and reduce network infrastructure costs. This can be especially useful in emerging markets where Internet infrastructure is only now improving.

Figure 1:
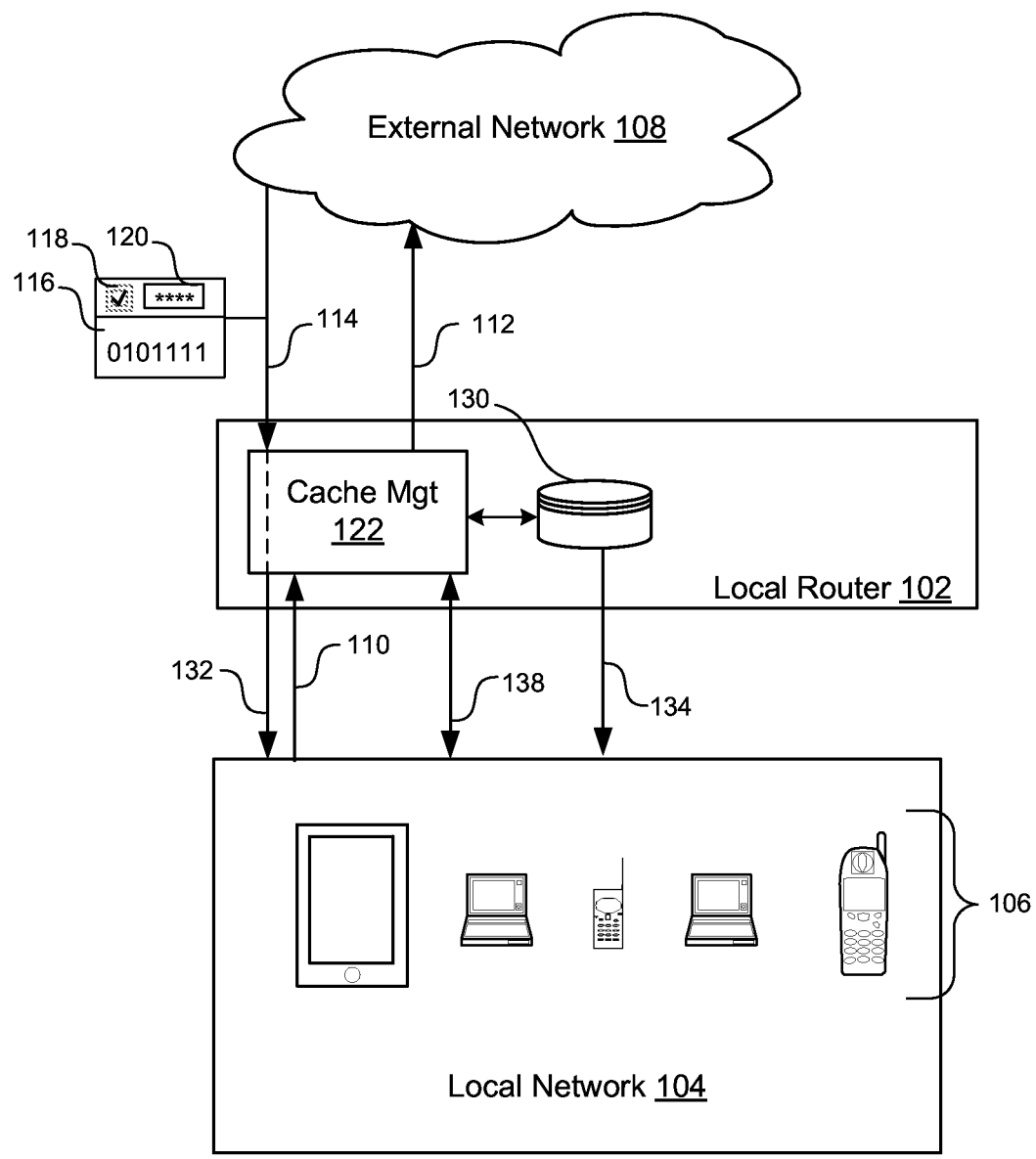
FIG. 1 is a block diagram illustrating content specific caching for a local router, consistent with various embodiments.

The figures depict various embodiments of the disclosed technology for purposes of illustration only. One skilled in the art will readily recognize from the following discussion that alternative embodiments may be employed.

DETAILED DESCRIPTION

The disclosed technology is directed to caching selected data content (e.g., text, graphics, multimedia content, object code (e.g., binary files or "packages"), or indeed any static resource) at a local router, e.g., a router that provides wired or wireless network access (e.g., Ethernet or WiFi access), also known as "hotspots." Local routers can commonly be found at homes, offices, "Internet cafés," and indeed any location that provides network (e.g., Internet) access to multiple users. The local router can be configured to securely provide access to its cache only to either a particular server system, e.g., via a public or private network, or to client devices in a local network having installed thereon a specific client application (e.g., a mobile application). In a first aspect, the specific application of a client device in the local network provided by the local router can push content (e.g., a static resource or a binary package) to the cache of the local router such that other client devices can access the static resource or binary package. For example, the binary package may be the Android Package Files (APK) for a mobile application on a mobile device. In a second aspect, the particular server system can tag specific data content that is cacheable by the local router. For example, a client device in the local network can request specific content from the particular server system. In response, the particular server system sends the tagged data content to the requesting client device. When the local router receives the tagged data content intended for the requesting client device, the tagged data content can be cached on the local router for access by other client devices in the local network.

In the first aspect, a local router is able to cache data resources from a client device for later peer-to-peer sharing of the data resources within a local network (e.g., anticipating the need for the data resource by other client devices). For example, a first client device may have a "version 1.1" of a mobile application. The local router can cache this version of the mobile application. When a second client device having an earlier version (e.g., "version 1.0") of the mobile application joins the local network, the second client device can access the cache of the local router to update its version of the mobile application without needing to request such update through an Internet Service Provider (ISP). Thus, the second client device employs the cache of the local router without having to incur charges associated with utilizing the ISP. Hence, the disclosed router cache reduces network utilization across all communication links from client devices to external servers. In this aspect, caching of the data resources is independent of any action from an external network (e.g., the Internet).

In the second aspect, a specific web server system in an external network can transfer content-specific "intelligence" for caching on a local level to a local router by tagging data content. In various embodiments, the tagged data content can be copied to various mirror servers and/or content delivery networks, and hence, propagated to multiple local routers when such data content is requested. The local router can utilize the content-specific intelligence by caching the tagged data content coming into the local network to satisfy requests from any client device. Whereas a conventional client-side router is unaware of data delivery patterns at the server level, the disclosed local router is made aware via tags of what data content is most likely to be requested by other client devices. Accordingly, the disclosed router cache reduces network utilization across all communication links between client devices and the specific server system.

FIG. 1 is a data flow diagram illustrating content specific caching for a local router 102, consistent with various embodiments. The local router 102 can establish a local network 104 to which one or more client devices 106 can attach. For example, the local router 102 may be a router placed in a public/semi-public premise to provide an Internet "hotspot," e.g., a café, a restaurant, a library, or any other business. Alternatively, the local router 102 may be a router placed in a private premise to provide Internet for devices therein, e.g., a home or a company. The local router 102 enables the client devices 106 to communicate with each other. The local router 102 further provides a connection to an external network 108, e.g., the Internet or various other external networks of computing devices. In various embodiments, the local router 102 can communicate with the client devices 106 through a wired or a wireless connection, and thus enable the client devices 106 to communicate with other devices (not illustrated) via the external network 108.

A data request flow through the local router 102 may include one of the client devices 106 sending a data object request 110, e.g., request for a webpage, a media object, an executable script or binary, or a portion thereof, to the local router 102. The local router 102 may then forward the data object request 110 to the external network 108 (assuming that the requested data object resides external to the local network 104) by sending a network request 112 via external network 108 to a remote server computing device ("remote server," not illustrated). The server computing device can then return via the external network 108 with a downlink transmission 114, e.g., a set of network packets representing requested data object 116, back to the local router 102 to respond to the network request 112. In response to receiving the downlink transmission 114, the local router 102 routes the downlink transmission 114 to the client device that originated the data object request 110.

During content-specific caching, the downlink transmission 114 may include a cacheable tag 118 and an authentication signature 120 together with the requested data object 116. For example, a remote server over the external network 108 can determine that some data objects contain static resources that may be frequently requested by users over the external network 108. Static resources are data objects that do not vary depending on a requesting user or a web browsing session of the data object request.

When the remote server determines that a data object contains a static resource, the downlink transmission 114 generated by the remote server can include not only the requested data object 116, but also the cacheable tag 118 indicating that the requested data object 116 is intended to be cached by a downstream device, e.g., the local router 102. The downlink transmission 114 may further include the authentication signature 120 such that the local router 102 can determine that the cacheable tag 118 originated from a trusted source (e.g., the remote server) rather than some other intermediary device, e.g., between local router 102 and the remote server. The local router 102 may include a cache management module 122 that processes the incoming downlink transmissions, e.g., the downlink transmission 114, to determine whether to cache the payload data included in the incoming downlink transmissions. The cache management module 122 or a separate router module can determine whether the authentication signature 120 matches one of the trusted sources through a security mechanism, e.g., by matching against an authorized list of servers. The authentication signature 120 may be encrypted or otherwise encoded by a variety of known encryption and/or encoding methods.

Once the cacheable tag 118 is determined to be from a trusted source by the local router 102, e.g., by verifying the authentication signature 120, and the cacheable tag is determined to indicate that the requested data object 116 is intended to be cached, the cache management module 122 stores the requested data object 116 into a local cache 130. The local cache 130 may either be a volatile or non-volatile storage medium, e.g., flash memory, other solid-state memory, hard disk, other persistent storage medium, random access memory, or any combination thereof. Regardless of whether or not the cacheable tag 118 exists or whether the cacheable tag 118 indicates that the requested data object 116 is to be cached, the requested data object 116 is routed to the requesting client device via a downlink forward 132.

After the requested data object 116 is stored in the local cache 130, the requested data object 116 may be indexed by the cache management module 122 for convenient access by future client requests from the client devices 106 connected to the local router 102. For example, if a later instance of the data object request 110 is submitted by one of the client devices 106 to the local router 102 and processed by the cache management module 122, then instead of sending another instance of the network request 112, the cache management module 122 can provide a cache download 134 directly from the local cache 130. It is noted that although the cache download 134 is illustrated as originating from the local cache 130, the cache management module 122 can be responsible for generating and sending the cache download 134 after accessing the local cache 130.

Content specific caching may also include a resource synchronization 138. The resource synchronization 138 includes the local router 102 (e.g., by the cache management module 122) sending a resource version inquiry to the client devices 106 and receiving reports of version identifiers of a static resource from the client devices 106. The resource synchronization 138 further includes that when a client device reports a version identifier that is more updated than a current version stored in the local cache 130 (or if no version at all of the static resource is stored in the local cache 130), the local router 102 sends a resource synchronization request to the client device. The local router 102 then receives a resource upload from the client device in response to the resource synchronization request, where the resource upload includes a version of the static resource in the local cache. In some embodiments, the cache management module 122 can first ensure that the client device reporting the version identifier that is more updated than the current version on the local cache 130 also has the most updated version of the static resource from amongst all of the client devices 106 in the local network 104.

When a client device reports a version identifier that is less updated than the current version stored in the local cache 130, the current version in the local cache 130 may be pushed to the client device for installation and update. Alternatively, when a user of one of the client devices 106 requests a version update of the static resource, instead of forwarding the request onward to the external network 108, the current version in the local cache 130 is returned as a response to the version update inquiry.

Figure 2:
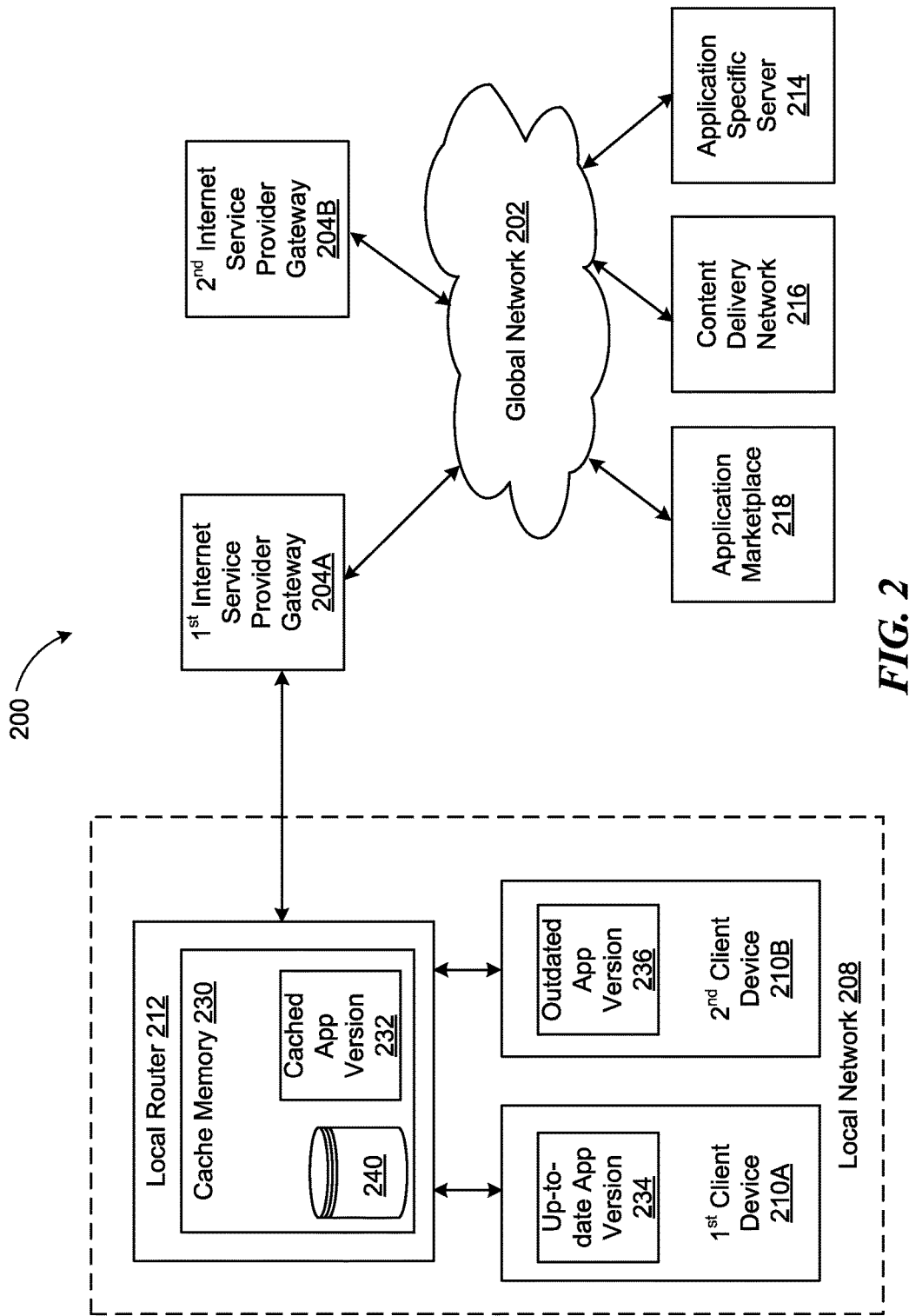
FIG. 2 is a block diagram illustrating a network architecture, consistent with various embodiments.

FIG. 2 is a block diagram illustrating a network architecture 200 implementing content specific caching, consistent with various embodiments. The network architecture 200 includes a global network 202, e.g., the multitude of networks making up the "Internet." The global network 202 may be the external network 108 of FIG. 1. Various local networks can access the global network 202 through ISP gateways 204 (e.g., a first ISP gateway 204A and a second ISP gateway 204B, collectively as "ISP gateways 204").

A local network 208 can comprise client devices 210 (e.g., a first client device 210A and a second client device 210B, collectively as the "client devices 210"). The local network 208 is established through a common connection of the client devices 210 with a local router 212. As an example, the local router 212 is shown to be connected to the global network 202 through the first ISP gateway 204A in FIG. 2. The local network 208 may be the local network 104 of FIG. 1. The local router 212 may be the local router 102 of FIG. 1. The client devices 210 can request content available in the global network 202 through the local router 212. In response to receiving a content request from one of the client devices 210, the local router 212 may request such content from the global network 202 through the first ISP gateway 204A.

Data content generally resides on various server systems connected to the global network 202, including, for example, an application specific server system 214, a content delivery network (CDN) 216, an application marketplace system 218. The application specific server system 214 interacts with a specific application running on the client devices 210, e.g., the client device 210A and the client device 210B. The specific application, for example, may be a mobile application, a web application (e.g., a social networking system), or desktop application.

The CDN 216 is a large distributed system of servers deployed in multiple data centers across the global network 202. The CDN 216 serves content to end-users, e.g., the client devices 210, with high availability and high performance. For example, the CDN 216 may be coupled to the application specific server system 214 to help distribute content from the application specific server system 214 without bottlenecking the application specific server system 214.

The application marketplace system 218 is one or more computer servers deployed to distribute applications that require installation to the client devices 210. For example, the application marketplace system 218 may be the Google Play™ store, the iTunes Store™, the Google Chrome Web Store™, the Xbox Live Store™, the PlayStation Store™, or any other application distribution server systems.

The local router 212 is able to communicate with the application specific server system 214, the CDN 216, and the application marketplace system 218 through the first ISP gateway 204A. The disclosed technology reduces network traffic between the local router 212 and the first ISP gateway 204A by reducing content requested from the application specific server system 214, the CDN 216, and the application marketplace system 218.

The local router 212 may include a cache memory 230. The cache memory 230 may be the local cache 130 of FIG. 1. The cache memory 230 may store a cached application version 232 of a specific application corresponding with the application specific server system 214. The cached application version 232 is utilized to reduce network traffic of updating the specific application by requesting installation package downloads from the application marketplace system 218.

When the local router 212 is first initiated into the local network 208, the cache memory 230 is empty and hence does not contain any cached application version. When a client device with the specific application installed then joins the local network 208, the specific application (e.g., including the installation package) of that client device may be cached as the cached application version 232 in the cache memory 230. After the cached application version 232 is stored, a resource synchronization process enables the local router 212 to keep the cached application version 232 up-to-date. In some embodiments, only a single application version is cached per application. In other embodiments, only a single application version is cached per application and per client device type. That is, multiple application versions may be cached for the same application for different devices (e.g., a HTC™ Android™ phone and a Samsung™ Android™ device).

The cached application version 232 may be updated through a peer-to-peer resource synchronization process. For example, the local router 212 can determine version identifiers of the specific application from each of the client devices 210 in the local network 208. The client device with the most updated application version may be identified in this process. For example, the first client device 210A may include an up-to-date application version 234. In this scenario, the version identifier of the up-to-date application version 234 is compared against the cached application version 232. The local router 212 may then determine that the cached application version 232 is not as updated as the up-to-date application version 234. As a result, the local router 212 may request the up-to-date application version 234 to be uploaded to the cache memory 230 replacing the original cached application version 232.

Under the disclosed resource synchronization process, the local router 212 may update outdated versions of applications either automatically or upon request. For example, the second client device 210B may include an outdated application version 236. A user of the second client device 210B may decide to update the specific application corresponding to the outdated application version 236. When the user submits a request intended for the application marketplace 218 to the local router 212, the local router 212 can instead pipe (e.g., transmit) the cached application version 232 to the second client device 210B. Alternatively, the specific application may include a link for local update of the specific application. When the user activates the link for local update, the local router 212 can pipe the updated cached application version 232 to the second client device 210B.

To automatically update application versions, the local router 212 may periodically check for version identifiers of the client devices. When the outdated application version 236 is detected to be less updated than the cached application version 232, the local router 212 may automatically push the cached application version 232 to the second client device 210B. To accomplish this end, the local router 212 and the client devices 210 may be able to execute a secure protocol to authenticate access between each other.

Applications and files for installation of applications tend to include a large quantity of data and content within installation packages. If the premises or facility hosting the local router 212 subscribes to an ISP that charges by amount of network usage, any large quantity of network traffic would be costly. The cached application version 232 stored on the local router 212 enables client devices 210 to update within the local network 208 without having to download the most up-to-date version of the specific application from the application marketplace system 218. Hence, the disclosed peer-to-peer resource synchronization process reduces network traffic that is most costly to consumers and/or local merchants providing a global network connection to consumers.

The cache memory 230 may further include a content cache 240. The content cache 240 is utilized to reduce network traffic, particularly downloads from the CDN 216 or the application specific server system 214. For example, the content cache 240 may be constructed based on content specific intelligence from the application specific server system 214. Each application-specific server system is capable of distinguishing the nature of its content request without using any special heuristics, and is able to accurately divide contents it serves as either a static resource or a dynamic resource.

The content cache 240 leverages the content-specific intelligence from the application-specific server system 214. The application-specific server system 214 can determine whether its various data resources are considered dynamic or static. For example, static resources may include binaries, images, icons, JavaScript packages, advertisements created (e.g., advertisement image, audio or video), cascading style sheets (CSS), or other media files. Dynamic resources may include newsfeeds, web-based communication between users, personal data, or other content related to specific web sessions or specific users. The application-specific server system 214 may label some or all of static resources with a cacheable tag, e.g., the cacheable tag 118 of FIG. 1, to indicate that such resources are to be cached on a local router level.

The application-specific server system 214 may also label data content with the cacheable tag based on prediction of how likely the client devices 210 would request the data content. The prediction may be based on machine learning, controlled experimentations, or other methodologies. In some embodiments, the application-specific server system 214 may label data content with the cacheable tag with conditionals, e.g., cacheable based on geographic location of the local router 212 or based on total cache memory space of the cache memory 230.

For example, a first data content may be labeled with a cacheable tag, and a second data content may be labeled without a cacheable tag. The associated cacheable tag of the first data content may be mirrored through content delivery networks, e.g., the CDN 216. When one of the client devices 210 requests the first data content from the application-specific server system 214, either the CDN 216 or the application specific server system 214 can reply by serving the first data content as well as the associated cacheable tag. The local router 212 can then determine that the first data content is intended to be cached and place the first data content in the content cache 240. The local router 212 can determine that the second data content is not to be cached by identifying either a lack of the cacheable tag or another data tag specifically indicating that the second data content is not to be cached. Regardless of the cacheability, the requested content is delivered to the requesting client device.

The disclosed content specific caching leverages the content specific intelligence of the application specific server system 214. This caching enables the application specific server system 214 to better manage network optimization on a local network level (i.e., instead of a server level through conventional means of CDNs).

Figure 3:
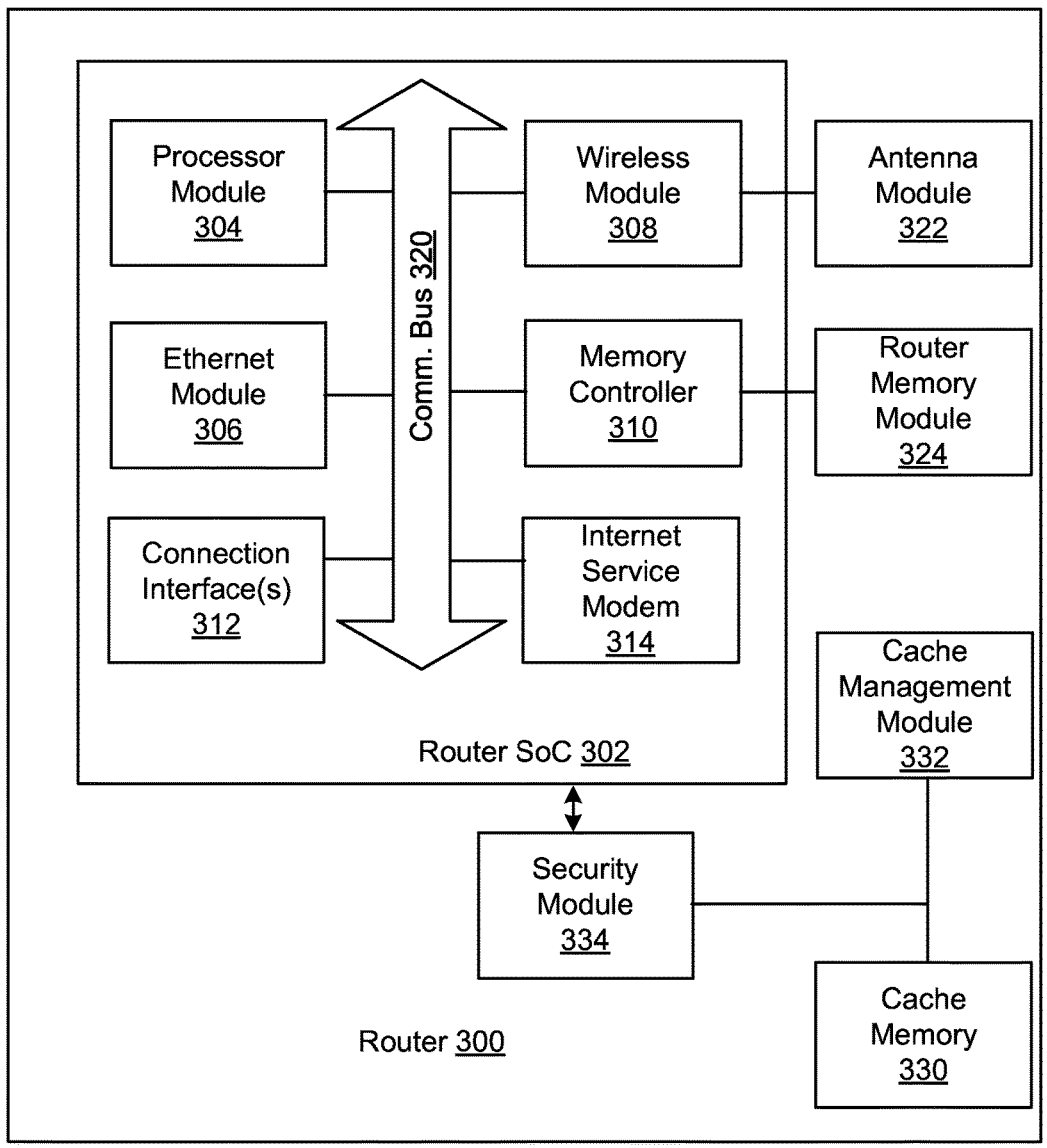
FIG. 3 is a control flow diagram illustrating an example of a local router, consistent with various embodiments.

FIG. 3 is a control flow diagram illustrating an example of a local router 300, consistent with various embodiments. The local router 300 may include a router system-on-a-chip (SoC) device 302. The SoC device 302 may include a processor 304, an Ethernet module 306, a wireless module 308, a memory controller 310, one or more other connection interface(s) 312 (e.g., general purpose input/output (GPIO), universal asynchronous receiver/transmitter (UART), or universal serial bus (USB)), and an Internet service modem 314. The components of the SoC device 302 may be connected through a bus 320. Operations of the wireless module 308, the memory controller 310, the Ethernet module 306, and the connection interface(s) 312 may be controlled by the processor 304 via the bus 320. In some embodiments, some or all of the modules and components within the SoC device 302 may instead be implemented as outside of a system-on-chip device.

The SoC 302 may use the wireless module 308 to provide a wireless LAN to nearby client devices with WiFi capabilities. For example, the wireless module 308 may be a network media access controller (MAC) device that provides packet transmission to client devices via a radio frequency front end (e.g., electronic radio circuitry for a wireless Wi-Fi transceiver) and an antenna module 322. In some embodiments, the components and/or modules of the SoC device 302 may be provided on a single router chip. In other embodiments, the modules can be implemented as a number of separate devices.

The wireless module 308 and the Ethernet module 306 are network modules that establish a local network. The Ethernet module 306 enables wired Ethernet connection to the local network. The Internet service modem 314 provides a connection from the local network to a global network, e.g., the external network 108 of FIG. 1 or the global network 202 of FIG. 2.

The memory controller 310 provides access to a router memory module 324. The router memory module 324 may include a flash memory, a static random access memory (SRAM), a synchronous dynamic random access memory (SDRAM), or any combination thereof. The router memory module 324 may store passwords, local network configurations, security codes, ISP information, router firmware, or other local network data. Administrative users of the local router 300 may configure and change what is stored on the router memory module 324 through a webpage through a local Internet Protocol (IP) address in the local network.

The local router 300 includes a cache memory 330. The cache memory 330 may be the local cache 130 of FIG. 1 or the cache memory 230 of FIG. 2. The cache memory 330 may be part of the router memory module 324 (not shown) or may be an independent memory device (as illustrated).

The local router 300 further includes a cache management module 332 for managing the cache memory 330. The cache management module 332 may be the cache management module 122 of FIG. 1. The cache management module 332 may be implemented as a set of instructions stored in the router memory module 324 executable by the processor 304. The cache management module 332 may be part of the router firmware stored in the router memory module 324. The cache management module 332 may be implemented with an application specific integrated circuit (ASIC), a field programmable gate array (FPGA) or a microcontroller. The cache management module 332 may perform processes described in FIG. 2 associated with the cache memory 230. The cache memory module 332 may also perform processes described further in FIG. 4 and FIG. 5.

In some embodiments, the local router 300 may include a security module 334. For example, the security module 334 may be implemented as a set of instructions stored in the router memory module 324 executable by the processor 304. The security module 334 may be part of the cache management module 332. The security module 334 may be a separate processing device, e.g., an ASIC, a FPGA, or a microcontroller.

The security module 334 is configured to control access to the cache memory 330. For example, the cache memory 330 may be updated with data resources transferred from client devices connected via the Ethernet module 306 or the wireless module 308. As another example, the cache memory 330 may also be updated with data resources transferred from a remote server in the global network connected via the Internet service modem 314.

The security module 334 can verify whether an application running on one of the client devices attempting to upload a data resource (e.g., static media content, static executable binaries, or browser-side script or code) to the cache memory 330 is a trusted application. The data resource may be analyzed to determine whether the data resource matches as a version of a known application package. In some embodiments, each upload may include an authentication signature (e.g., the authentication signature 120 of FIG. 1) to verify the authenticity of the uploaded data resource.

The security module 334 can also verify a remote server in the global network attempting to upload a data resource (e.g., static media content, static executable binaries, or browser-side script or code) to the cache memory 330 is a trusted server. Authentication of the server may be based on a server attribute (e.g., Internet Protocol (IP) address, geographic location, MAC address, or other static network characteristics). In some embodiments, each upload may also include an authentication signature (e.g., the authentication signature 120) to verify the authenticity of the uploaded data resource.

Blocks, components, and/or modules associated with the local router 102 of FIG. 1, the network architecture 200 of FIG. 2, and the local router 300 may be implemented as hardware modules or a combination of hardware and software modules. Controlling modules may be operable as a processor or other computing device, e.g., a single board chip, application specific integrated circuit, or a field programmable field array.

Each of the modules may operate individually and independently of other modules. Some or all of the modules may be executed on the same host device or on separate devices. The separate devices may be coupled via a communication module to coordinate its operations via a wired interconnect or wirelessly. Some or all of the modules may be combined as one module. Processes described may be implemented as stored instructions on non-transitory memory space (e.g., volatile or non-volatile memory modules), that may be executed by one of the controlling modules.

A single module may also be divided into sub-modules, each sub-module performing separate method step or method steps of the single module. In some embodiments, the modules can share access to a memory space. One module may access data accessed by or transformed by another module. The modules may be considered "coupled" or capable of communicating with one another if they share a physical connection or a virtual connection, directly or indirectly, allowing data accessed or modified from one module to be accessed in another module. The storage server 200 and/or the storage system 300 may include additional, fewer, or different modules for various applications.

Figure 4:
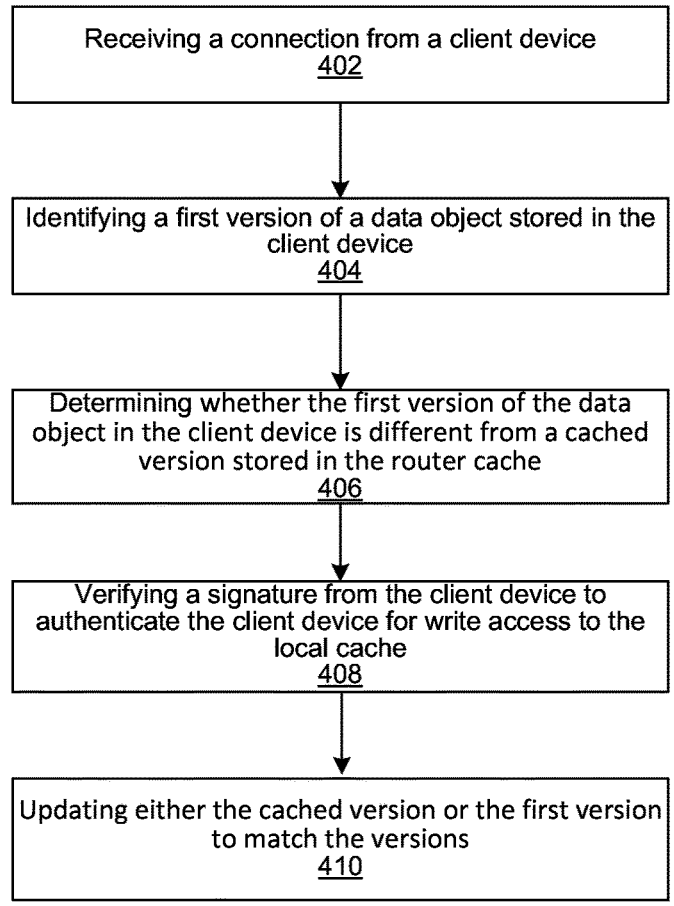
FIG. 4 is a flow chart illustrating a process of caching data content from a client device on a local router, consistent with various embodiments.

FIG. 4 is a flow chart illustrating a process 400 of caching data content from a client device on a local router, consistent with various embodiments. The process 400 implements caching at a local network level enabling peer-to-peer static resource updates through the local router. The client device may be one of the client devices 106 of FIG. 1 or the client devices 210 of FIG. 2. The local router may be the local router 102 of FIG. 1, the local router 212 of FIG. 2, or the local router 300 of FIG. 3. The process 400 includes the local router receiving a connection from a client device in step 402. The connection from the client device may be via wired Ethernet or wireless WiFi.

The local router identifies a version of a data object stored in the client device at block 404. For example, the data object may be a static resource (e.g., media object, static browser side script or code, or binary packages of an application). Step 404 may be performed in response to a periodic trigger of a resource synchronization process. Alternatively, the logic represented by block 404 may be performed when the data object is requested by the client device at the local router. If the data object is a specific application running on the client device, then the logic represented by block 404 may be performed when the specific application performs a network operation over a local network established by the local router.

Once the version of the data object is identified, the local router determines, at block 406, whether a cached version of the data object is available in a router cache of the local router; and when the cached version is available, whether the first version of the data object in the client device is different from the cached version stored in the router cache. The local router can also determine whether the version on the client device or the cached version stored in the local cache is more up-to-date. The logic represented by block 406 includes determining whether or not the local cache is storing any version of the data object. The lack of any version in the local cache means that whatever version on the client device is considered more up-to-date. The local cache may be the local cache 130 of FIG. 1, the cache memory 230 of FIG. 2, or the cache memory 330 of FIG. 3. If there is a cached version of the data object stored in the local cache, then the local router may determine whether the version on the client device is more up-to-date than the cached version by checking version identifiers or a timestamp (e.g., stored as metadata) related to when the versions are downloaded.

In the case where the version on the client device is more up-to-date than the cached version, the local router can request, receive, and verify a signature from the client device to authenticate the client device for write access to the local cache at block 408. The signature may be the authentication signature 120 of FIG. 1.

Responsive to determining that the first version is different from the cached version or that no cached version is available in the router cache, and when the write access to the local cache is granted, the local router updates either the cached version or the first version to match the versions at block 410. The version update may be based on whether the version on the client device is more up-to-date than the cached version. When the version on the client device is more up-to-date, the version update includes uploading the version on the client device to store in the local cache as replacement to the existing cached version, that is, if a cached version of the data object is stored in the local cache. When the version on the client device already matches the cached version, no action is taken.

In some embodiments, when the cached version is more up-to-date than the version on the client device, the version update includes querying a user of the client device whether the user agrees to download the cached version onto the client device. In other embodiments, when the cached version is more up-to-date than the version on the client device, the version update includes forcing a download of the cached version onto the client device. If the data object is a specific application, after the download is completed, the user of the client device may choose whether or not to install the downloaded data object. In at least one embodiment, when the cached version is more up-to-date than the version on the client device, no action is taken. In some embodiments, the cached version of the data object is only downloaded to the client device when the client device sends a request for the data object or for an update of the data object.

Figure 5:
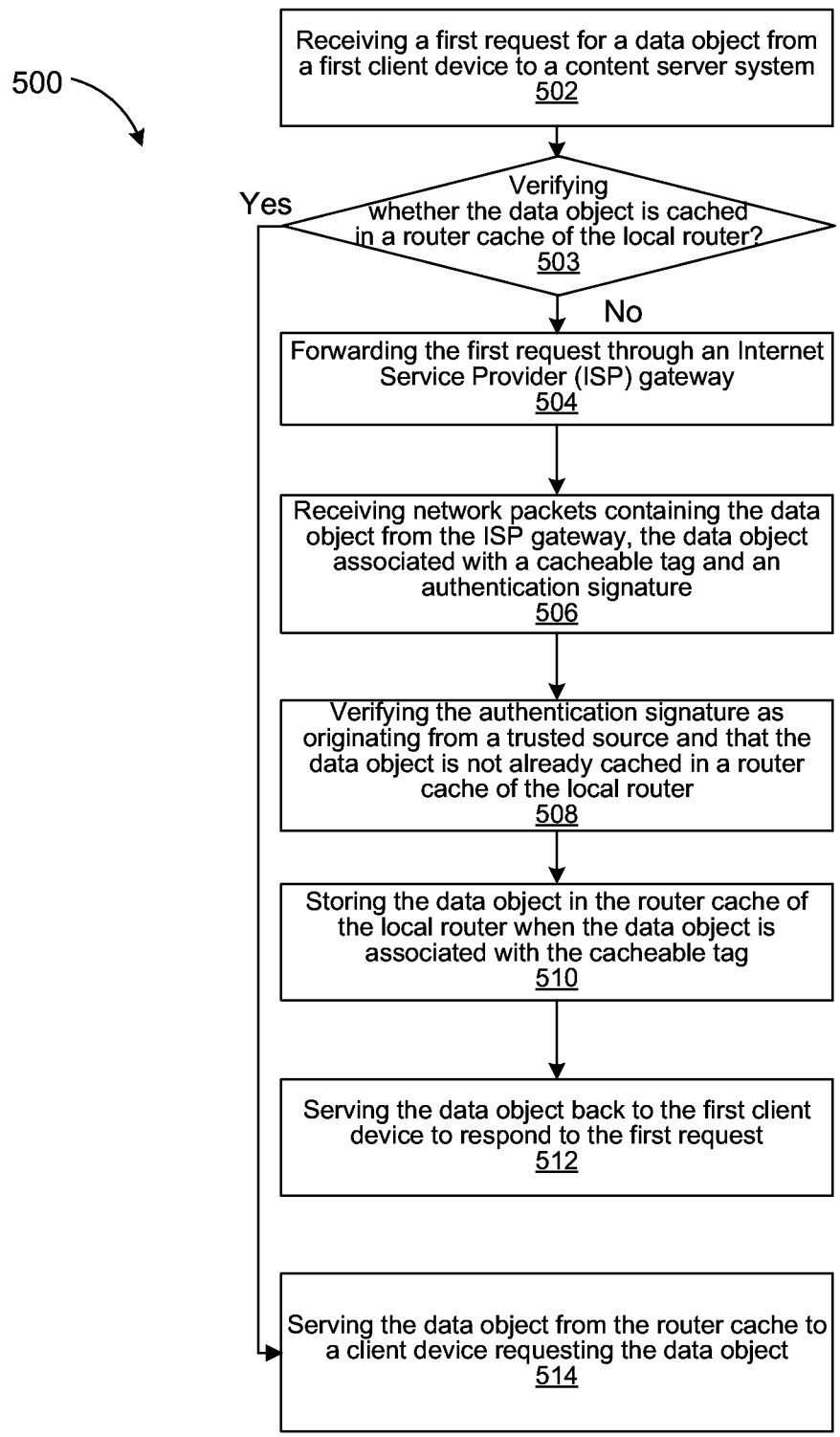
FIG. 5 is a flow chart illustrating a process of caching data content from a content server system on a local router, consistent with various embodiments.

FIG. 5 is a flow chart illustrating a process 500 of caching data objects from a content server system on a local router, consistent with various embodiments. The process 500 implements content specific caching that enables a content server system to identify resources to be cached on the local router. The process 500 includes the local router receiving a first request from a first client device to the content server system at the local router in step 502. The first client device may be one of the client devices 106 of FIG. 1 or the client devices 210 of FIG. 2. The local router may be the local router 102 of FIG. 1, the local router 212 of FIG. 2, or the local router 300 of FIG. 3. The content server system may be the application specific server system 214 of FIG. 2.

The local router verifies, in step 503, whether the data object requested by the first request is already cached in a router cache of the local router. For example, the local router can verify whether a requested data object is already cached in the local router by looking up a data object ID of the requested data object from a data object ID table in the local router. The data object ID can be a data hash of the requested data object such that a cached data object from a different website would still have a same data object ID. As another example, the local router can look up a filename/path (e.g., a URL) of the first request in a source filename/path table of the local router.

If the local router determines that the data object requested by the first request is already cached in step 503, then the cached data object is served to the first client device to respond to the first request in step 514. If the data object is not already cached, the local router forwards the first request through an ISP gateway to a global network in step 504. The ISP gateway may be the first ISP gateway 204A of FIG. 2. The global network may be the external network 108 of FIG. 1 or the global network 202 of FIG. 2. In response, the local router receives network packets from the content server system through the ISP gateway in step 506. The network packets contain data object requested by the first request. The network packets can also contain a cacheable tag associated with the data object. The cacheable tag indicates that the data object is intended to be cached in the router cache of the local router. The cacheable tag may be the cacheable tag 118 of FIG. 1.

In some embodiments, the network packets further includes an authentication signature. The local router can verify the authentication signature as originating from a trusted source to gain access to store the data object in the router cache in step 508. Optionally in step 508, the local router can again verify that the data object is not already stored in the router cache. This can be done in a similar fashion as step 503. The local router can also generate a hash value based on the received data object and compare the hash value against a list of hash values of cached objects in the router cache. When the authentication signature is verified, the data object is not already cached, and the network packets contain the cacheable tag, the local router stores the data object in the router cache in step 510. The router cache may be the local cache 130 of FIG. 1, the cache memory 230 of FIG. 2, or the cache memory 330 of FIG. 3.

In step 512, the data object is served back to the first client device to respond to the first request. At a later time, when a second client device sends a second request for the same data object, instead of forwarding the second request to the content server system, the local router serves the cached data object from the router cache to the second client device to respond to the second request in step 514.

While processes or blocks are presented in a given order in FIGS. 4 and 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

What is claimed is:

1. A method, comprising:
receiving, by a local router, a connection from a client device to a local network established by the local router;
identifying, by the local router, a first version of a data object in the client device, wherein the data object comprises a cacheable tag indicating that the data object should be cached, and wherein the cacheable tag is based on a likelihood that the data object would be requested by other client devices on the local network;
determining, by the local router, whether a cached version of the data object is available in a router cache of the local router, and when the cached version is available, whether the first version of the data object in the client device is different from the cached version stored in the router cache;
verifying, by the local router, a signature from the client device to authenticate the client device for write access to the router cache; and
responsive to determining that the first version is different from the cached version or that no cached version is available in the router cache, updating, by the local router, the router cache to store the first version as the cached version of the data object in the router cache, wherein the router cache is updated once the signature is verified.

2. The method of claim 1, wherein identifying the first version of the data object includes identifying the first version of an application running on the client device, wherein the data object is a binary package corresponding to the application.

3. The method of claim 1, wherein said updating includes comparing versions of the data object from all client devices in the local network to determine which version is most up-to-date.

4. The method of claim 3, wherein said updating includes uploading the first version of the data object to the router cache when the first version is determined to be the most up-to-date.

5. The method of claim 3, wherein said updating includes querying a user through the client device to download the cached version from the router cache when the cached version is determined to be more up-to-date than the first version in the client device.

6. The method of claim 3, wherein said updating includes downloading the cached version from the router cache in response to determining that the cached version is more up-to-date than the first version in the client device.

7. The method of claim 3, further comprising:
receiving an update request from the client device to update the data object on the client device;
wherein said updating includes downloading the cached version of the data object from the router cache in response to receiving the update request.

8. The method of claim 7, wherein the data object is an application content package for installing or executing a specific application; and wherein receiving the update request includes receiving the update request to update the specific application.

9. A network router comprising:
a modem to connect with a global network;

a network module to establish a local network through which one or more client devices are able to connect and communicate with each other;
a cache memory to store one or more static resources;
a security module to verify an authentication signature from the content source to grant write access to the cache memory of the network router; and
a cache management module to determine whether to store a data object from a content source over either the global network or the local network based on a cacheable tag or version identifier from the content source, wherein the cacheable tad is based on a likelihood that the data object would be requested by other client devices on the local network;
wherein the cache management module is configured to:
determine whether a cached version of the data object is available in the cache memory, and when the cached version is available, whether a first version of the data object from the content source is different from the cached version stored in the cache memory; and
responsive to determining that the first version is different from the cached version or that no cached version is available in the cache memory, update the cache memory to store the first version as the cached version of the data object after the authentication signature is verified.

10. The network router of claim 9, wherein when the modem receives the data object associated with the cacheable tag indicating that the data object is intended to be cached, the cache management module is configured to store the data object in the cache memory.

11. The network router of claim 9, wherein when the network module receives a request for the data object from a client device, the cache management module is configured to respond by sending a version of the data object in the cache memory to the client device.

12. The network router of claim 9, wherein the cache management module is configured to identify a client device running a first version of a specific application through the network module; and wherein the cache management module is further configured to store a data package of the first version in the cache memory when the first version is more up-to-date than a cached version of the specific application in the cache memory or when the cache memory contains no cached version of the specific application.

13. The network router of claim 9, wherein the cache management module is configured to request a client device connected through the network module to update a specific application from a cached version of the specific application stored in the cache memory.

14. A computer-readable data storage memory storing computer-executable instructions that, when executed, cause a computer system to perform a computer-implemented method, wherein the computer-executable instructions comprise:
instructions for receiving, by a local router, a connection from a client device to a local network established by the local router;
instructions for identifying, by the local router, a first version of a data object in the client device, wherein the data object comprises a cacheable tag indicating that the data object should be cached, and wherein the cacheable tag is based on a likelihood that the data object would be requested by other client devices on the local network;
instructions for determining, by the local router, whether a cached version of the data object is available in a router cache of the local router, and when the cached version is available, whether the first version of the data object in the client device is different from the cached version stored in the router cache; and
instructions for verifying, by the local router, a signature from the client device to authenticate the client device for write access to the router cache;
instructions for responsive to determining that the first version is different from the cached version or that no cached version is available in the router cache, updating, by the local router, the router cache to store the first version as the cached version of the data object in the router cache after the signature is verified.

15. The computer-readable data storage memory of claim 14, wherein the instructions for identifying the first version of the data object includes instructions for identifying the first version of an application running on the client device, wherein the data object is a binary package corresponding to the application.

16. The computer-readable data storage memory of claim 14, wherein the instructions for updating includes instructions for comparing versions of the data object from all client devices in the local network to determine which version is most up-to-date.

17. The computer-readable data storage memory of claim 16, wherein the instructions for updating includes instructions for uploading the first version of the data object to the router cache when the first version is determined to be the most up-to-date.

18. A method, comprising:
receiving, by a local router, a connection from a client device to a local network established by the local router;
identifying, by the local router, a first version of a data object in the client device, wherein the data object comprises a cacheable tag indicating that the data object should be cached, and wherein the cacheable tag is based on a likelihood that the data object would be requested by other client devices on the local network;
determining, by the local router, whether a cached version of the data object is available in a router cache of the local router, and when the cached version is available, whether the first version of the data object in the client device is different from the cached version stored in the router cache;
responsive to determining that the first version is different from the cached version or that no cached version is available in the router cache, updating, by the local router, the router cache to store the first version as the cached version of the data object in the router cache, wherein said updating includes:
comparing versions of the data object from all client devices in the local network to determine which version is most up-to-date; and
uploading the first version of the data object to the router cache responsive to determining that the first version is the most up-to-date.

19. A network router comprising:
a modem to connect with a global network;
a network module to establish a local network through which one or more client devices are able to connect and communicate with each other;
a cache memory to store one or more static resources; and
a cache management module to determine whether to store a data object from a content source over either the global network or the local network based on a cacheable tag or version identifier from the content source, wherein the cacheable tag is based on a likelihood that the data object would be requested by other client devices on the local network;
wherein the cache management module is configured to identify a client device running a first version of a specific application through the network module; and
wherein the cache management module is further configured to store a data package of the first version in the cache memory responsive to when the first version is more up-to-date than a cached version of the specific application in the cache memory or when the cache memory contains no cached version of the specific application.

20. A computer-readable data storage memory storing computer-executable instructions that, when executed, cause a computer system to perform a computer-implemented method, wherein the computer-executable instructions comprise:
instructions for receiving, by a local router, a connection from a client device to a local network established by the local router;
instructions for identifying, by the local router, a first version of a data object in the client device, wherein the data object comprises a cacheable tag indicating that the data object should be cached, and wherein the cacheable tag is based on a likelihood that the data object would be requested by other client devices on the local network;
instructions for determining, by the local router, whether a cached version of the data object is available in a router cache of the local router, and when the cached version is available, whether the first version of the data object in the client device is different from the cached version stored in the router cache; and
instructions for responsive to determining that the first version is different from the cached version or that no cached version is available in the router cache, updating, by the local router, the first version as the cached version of the data object;
wherein the instructions for updating includes instructions for comparing versions of the data object from all client devices in the local network to determine which version is most up-to-date; and
wherein the instructions for updating includes instructions for uploading the first version of the data object to the router cache responsive to determining that the first version is the most up-to-date.

* * * * *